Patented Aug. 2, 1938

2,125,310

UNITED STATES PATENT OFFICE 2,125,310

METHOD OF ALKYLATING PHENOLS

Ralph P. Perkins, Midland, Mich., assignor to The Dow Chemical Company, Midland, Mich., a corporation of Michigan No Drawing. Application May 1, 1936, Serial No. 77,383

7 Claims. (Cl. 260—624)

This invention concerns an improved method of alkylating phenols with alcohols containing 6 or more carbon atoms, Two general methods of alkylating a phenol with an alcohol are known, viz.: (1) by warming a mixture of a phenol and alcohol with a large excess of sulphuric acid to temperatures in the neighborhood of 40°–70° C., and (2) by heating a mixture of a phenol and alcohol with a small proportion of a catalyst, such as an acid-activated bleaching earth, to a temperature above 200° C. under pressure. Each of these methods involves certain disadvantages. The first method is costly, since it involves the use of sulphuric acid in amount representing several times the combined weight of the phenol and alcohol. Furthermore, the yields reported by this method are generally low, usually not exceeding 50 per cent of theoretical (see Meyer et al., Monatsh, 53–54, 721–752 (1929)). The second method is hazardous, since it involves heating materials which are both toxic and inflammable under high pressure. Also, water formed by the reaction is retained in the mixture and tends to retard further reaction and prevent the same from running to completion.

An object of the present invention is to provide a method of alkylating a phenol with an alcohol, whereby the reaction may be carried out at a moderate pressure in the presence of only a small proportion of catalyst, water being removed from the reacting mixture as it is formed, to produce alkyl phenols in high yield. Other objects will be apparent from the following description of the invention.

I have found that, when an alcohol containing at least six carbon atoms is employed as the alkylating agent, the reaction may be carried out at approximately normal pressure simply by heating a mixture of the phenol and such alcohol with a small proportion of catalyst to a temperature at which the alcohol is decomposed into an olefine and water, while distilling off the water as it is formed. A portion of the olefine distills off along with the water, but such olefine may be removed as a separate layer from the aqueous distillate and returned to the principal reaction. By operating in this cyclic manner, the employment of a large proportion of catalyst is avoided, the olefine formed as an intermediate product serves as an assistant in removing water from the reaction by forming a relatively low boiling mixture with the water, and an alkyl phenol may be produced in higher yield than is possible by either of the previously known methods of carrying out the reaction hereinbefore described. A large number of alkyl phenols have been prepared according to the foregoing method, among which are compounds useful as germicides, fungicides, insecticides, etc. The invention, then, consists in the method hereinafter fully described and particularly pointed out in the claims.

The alcohol employed in the process is one having at least 6 carbon atoms and which can be dehydrated to form an olefine. It may be a primary, secondary, or tertiary alcohol and may be of the aliphatic, alicyclic, or aralkyl type. Such alcohol usually can be decomposed catalytically under atmospheric pressure at a temperature below its boiling point to form water and a water-immiscible liquid olefine which forms a low boiling mixture with the water, thereby aiding in removal of the latter by distillation, and which can be separated directly from the water in the distillate and returned to the reaction. The alcohols containing less than six carbon atoms usually must be heated under pressure or at a temperature above their boiling point in order to decompose the same into an olefine and water and the olefine so produced is usually a gas or a low boiling liquid which does not aid greatly in distilling water from the reacting mixture and which is relatively difficult to handle in the process. Among the various alcohols which may satisfactorily be used are: n-hexyl alcohol, secondary hexyl alcohol, tertiary hexyl alcohol, cyclohexanol, lauryl alcohol, cetyl alcohol, alpha-phenylethyl alcohol, beta-phenylethyl alcohol, phenylpropyl alcohol, etc.

The phenolic reactant may be a monohydric or polyhydric phenol which may contain nuclear substituents such as alkyl or halogen groups, etc., provided one or more positions in the nucleus are open for the introduction of an alkyl group by the reaction. Among the various phenolic compounds which may be used are: phenol, ortho-chlorophenol, para-bromophenol, cresol, chlorocresol, naphthol, ortho-phenylphenol, para-phenylphenol, etc. In general, any phenol which can be alkylated to form a corresponding alkyl phenol by reaction with an olefine can be employed in the present process.

A stable catalyst of the dehydration and condensation type is used, since the function of the catalyst is to promote dehydration of the alcohol in liquid phase and chemical condensation of the resultant olefine with the phenol. By a "stable" catalyst I mean one which is not destroyed by the water formed in the reaction, i. e., if the catalyst is a material which forms a hydrate, it should be capable of being regenerated from such hydrate by heating the latter. Among the catalysts which may be employed in the process are acid activated bleaching earths such as Tonsil and Superfiltrol, etc.

In practicing the invention, the phenol and alcohol are heated together with a small proportion of catalyst to a temperature at which the alcohol is decomposed into water and an olefine, a portion of which latter reacts with the phenol. The water and unreacted olefine are distilled from the mixture, and the olefine is separated from water in the distillate and returned to the reaction. The reactants and catalyst may be employed in widely varying proportions and may be mixed prior to or during heating. In practice I prefer to treat the phenolic reactant with a small proportion, e. g., from 1 to 10 and preferably from 2 to 4 per cent of its weight, of the catalyst, heat the mixture to the reaction temperature, and slowly add one molecular equivalent or more of the alcohol, preferably with stirring.

The temperature to which the mixture must be heated in order to dehydrate the alcohol varies somewhat depending on the particular alcohol and catalyst employed. The dehydration usually occurs smoothly at temperatures between 100° and 200° C., particularly between 130° and 200° C. In practice, the mixture is usually heated at atmospheric pressure to a temperature between 100° and its boiling point, but it may be heated under a moderately elevated pressure, e. g. 1–4 atmospheres pressure, at a considerably higher temperature, e. g., 250° C., without detriment. However, due to the difficulty of distilling water and the olefine from the mixture under pressure, the reaction is preferably carried out at atmospheric pressure and may sometimes advantageously be carried out under vacuum.

Operation in the cyclic manner just described is preferably continued until distillation of water or olefine from the reaction mixture practically ceases. The mixture is then cooled, the catalyst removed therefrom by usual procedure, e. g. filtration, and the alkyl phenol product is separated by distillation or otherwise.

The alkyl phenol product usually contains the alkyl radical in a position ortho- or para- to the hydroxyl group, when such position in the phenol is free for substitution. The alkyl phenol in general corresponds to the alcohol and phenol from which it was formed, but when certain higher alcohols are employed as reactants, the aliphatic group which enters the phenol may undergo isomerism or the carbon chain thereof may be split and lower alkyl phenols be formed. For instance, by employing 2.4.4-trimethyl-pentanol-2 as a reactant, and an acid-activated bleaching earth as catalyst, for the alkylation of phenol, para-tertiarybutyl-phenol may be obtained as the principal alkyl phenol product.

Along with the alkyl phenol product some phenol-alcohol ether is sometimes obtained. Such ether may be rearranged to the desired alkyl phenol by prolonged heating in the presence of the catalyst, or it may be separated and added to a subsequent reaction mixture, in which it acts by mass action to prevent further formation of the same.

The following examples describe a number of ways in which the principle of the invention has been applied, but are not to be construed as limiting the invention.

*Example 1*

A mixture of 444 grams (4.73 moles) of phenol, 50 grams (0.49 mole) of normal hexyl alcohol, and 17.8 grams of Tonsil (an acid-activated bleaching earth) was heated at atmospheric pressure to 174° C., at which temperature water and hexene started to distill. Hexene in the distillate was separated continuously from the water and returned to the reaction. During the first 2 hours, 76.5 grams (0.76 mole) of additional normal hexyl alcohol was added with stirring. The operation was continued for an additional 2 hours, i. e., until a total of 20 cubic centimeters of water had been collected, the temperature being raised from 174° to 189° C. The mixture was then cooled, filtered, and distilled. There was obtained 163.3 grams of a mixture of isomeric hexyl phenols distilling at temperatures between 132° and 166° C. under 25 millimeters pressure. No hexyl phenyl ether was obtained. The yield of hexylphenols was 73 per cent of theoretical, based on the hexyl alcohol employed.

*Example 2*

A mixture of 282 grams (3 moles) of phenol, 100 grams (1 mole) of cyclohexanol, and 8.5 grams of Retrol (an acid-activated bleaching earth) was heated with stirring to 143° C., at which temperature cyclohexene and water started to distill. The cyclohexene in the distillate was separated continuously from the water and returned to the reaction. The temperature of the reaction mixture was raised to 175° C. in approximately 1 hour, by which time the distillation of water and cyclohexene had ceased, and the mixture was maintained at approximately 175° C. for an additional 2 hours, after which it was cooled, filtered and distilled. There was obtained 197.3 grams (2.1 moles) of unreacted phenol, 135 grams (0.77 mole) of a mixture of ortho- and para-cyclohexylphenols containing approximately 59 per cent of the ortho-isomer, and 19.3 grams of higher boiling products. The yield of cyclohexylphenols was 85 per cent of theoretical, based on the phenol reacted.

*Example 3*

A mixture of 220 grams (2 moles) of catechol, 100 grams (1 mole) of cyclohexanol, and 11 grams of Tonsil (an acid-activated bleaching earth) was heated with stirring at atmospheric pressure, water and cyclohexene being distilled from the mixture, and the cyclohexene in the distillate continuously separated and returned to the reaction. The distillation started when the temperature reached 146° C. and was complete when the mixture had been heated to 195° C. The mixture was then cooled, filtered, and fractionally distilled. There was obtained 114.4 grams (1.0 mole) of unreacted catechol, and 101.7 grams (0.53 mole) of a mixture of isomeric cyclohexylcatechols distilling at temperatures between 194° and 217° C. under 20 millimeters pressure, the yield thereof being approximately 53 per cent of theoretical, based on the cyclohexanol employed. The mixture of cyclohexyl-catechols was fractionally crystallized successively from benzene and carbon tetrachloride whereby the following compounds were separated:—(1) a monocyclohexyl-catechol melting at 107.8–108.6° C. (uncorrected), believed to be 4-cyclohexyl-catechol, and (2) an isomeric monocyclohexyl-catechol, melting at 141.5–142.5° C. (uncorrected), which is believed to be 3-cyclohexyl-catechol.

*Example 4*

A mixture of 576 grams (4 moles) of beta-naphthol, 200 grams (2 moles) of cyclohexanol, and 29 grams of Superfiltrol (an acid-activated bleaching earth) was reacted as in Example 3. The reaction started at 138° C., and was completed at 193° C. The reacted mixture was filtered and fractionally distilled, whereby there were obtained approximately 290 grams of unreacted beta-naphthol, approximately 295 grams of a mixture of isomeric cyclohexyl-beta-naphthols distilling at temperatures between 227° C. under 20 millimeters pressure and 198° C. under 3 millimeters pressure, and 47 grams of higher products, probably dicyclohexyl-beta-naphthols, distilling at temperatures between 238° and 252° C. under 3 millimeters pressure. Said higher products were a nearly solid resin at room temperature. The yield of monocyclohexyl-beta-naphthols was approximately 65 per cent of theoretical, based on the beta-naphthol reacted. The mixture of isomeric monocyclohexyl-beta-naphthols was fractionally crystallized successively from petroleum ether, chloroform, and cyclohexane, whereby a compound melting at 102.5–103° C., believed to be 1-cyclohexyl-2-naphthol having the formula

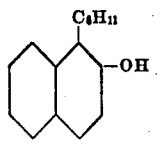

was separated in the form of a white microcrystalline powder, and another monocyclohexyl-beta-naphthol melting at 145.5–147° C., believed to be 6-cyclohexyl-2-naphthol having the formula

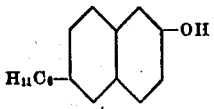

was separated in the form of white lustrous fine needles. Said products are useful as germicides, fungicides, and insecticides.

*Example 5*

A mixture of 566 grams (3.9 moles) of alpha-naphthol, 200 grams (2 moles) of cyclohexanol, and 29 grams of Retrol was reacted as in Example 3. The reaction started at 141° C. and was completed at 185° C. The reacted mixture was filtered and fractionally distilled, whereby 328.1 grams of a mixture of isomeric monocyclohexyl-alpha-naphthols was separated. The mixture of isomers was fractionally crystallized successively from cyclohexene and petroleum ether whereby the following compounds were separated: (1) a white crystalline compound melting at 98.8–99.1° C., believed to be 2-cyclohexyl-1-naphthol having the formula

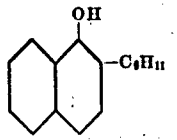

and (2) a white crystalline compound melting at 140.3–141.7° C., believed to be 4-cyclohexyl-1-naphthol having the formula

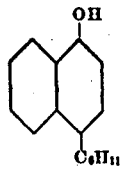

Said compounds are useful as germicides, fungicides, and insecticides.

Other modes of applying the principle of the invention may be employed instead of those explained, change being made as regards the method or compounds herein disclosed, provided the steps or compounds stated by any of the following claims or the equivalent of such stated steps or compounds be employed.

I therefore particularly point out and distinctly claim as my invention:

1. In a method of alkylating a phenol by heating the latter with a monohydric alcohol containing at least six carbon atoms in the presence of an acid activated bleaching earth, the steps which consist in distilling water and an olefine from the reacting mixture, separating the water and olefine in the distillate, and returning the olefine to the reaction.

2. The method of alkylating a phenol which comprises heating a mixture of the phenol, a monohydric alcohol containing at least six carbon atoms, and an acid activated bleaching earth at approximately atmospheric pressure to a temperature at which water and an olefine distill therefrom, separating the water and olefine in the distillate, and returning the olefine to the reaction.

3. The method of alkylating a phenol which comprises heating the phenol with between about 1 and about 10 per cent its weight of an acid activated bleaching earth, gradually adding to the mixture a monohydric alcohol containing at least six carbon atoms, distilling from the mixture at approximately atmospheric pressure water and an olefine, separating the water and olefine in the distillate, and returning the olefine to the reaction.

4. The method of alkylating a phenol which comprises heating at approximately atmospheric pressure a mixture of the phenol, a monohydric alcohol containing at least six carbon atoms, and an acid-activated bleaching earth in amount representing between about 2 and about 4 per cent the weight of the phenol to a temperature at which water and an olefine distill from the mixture, separating the water and olefine in the distillate, and returning the olefine to the reaction.

5. The method of alkylating phenol which comprises heating a mixture of phenol and a monohydric alcohol containing at least six carbon atoms with a small proportion of an acid activated bleaching earth at approximately atmospheric pressure to a temperature at which water and an olefine distill from the mixture, separating the water and olefine in the distillate, and returning the olefine to the reaction.

6. The method of making cyclohexylphenol which comprises heating a mixture of phenol and cyclohexanol with a small proportion of an acid activated bleaching earth at approximately atmospheric pressure to a temperature at which water and cyclohexene distill from the mixture, separating the water and cyclohexene in the distillate, and returning the cyclohexene to the reaction.

7. The method of making cyclohexyl-naphthol which comprises heating a mixture of naphthol, cyclohexanol, and an acid activated bleaching earth at approximately atmospheric pressure to a temperature at which water and cyclohexene distill from the mixture, separating the water and cyclohexene in the distillate, and returning the cyclohexene to the reaction.

RALPH P. PERKINS.